United States Patent
Beard et al.

(10) Patent No.: US 7,215,246 B1
(45) Date of Patent: May 8, 2007

(54) BINDING FOR ONE-WAY WIRELESS TRANSMISSIONS

(75) Inventors: Paul Beard, Milpitas, CA (US); Ryan Winfield Woodings, Boise, ID (US)

(73) Assignee: Cypress Semiconductor Corp., San Jose, CA (US)

(*) Notice: Subject to any disclaimer, the term of this patent is extended or adjusted under 35 U.S.C. 154(b) by 98 days.

(21) Appl. No.: 10/877,296

(22) Filed: Jun. 24, 2004

Related U.S. Application Data

(60) Provisional application No. 60/483,004, filed on Jun. 27, 2003.

(51) Int. Cl.
*G08B 1/08* (2006.01)

(52) U.S. Cl. ............... 340/539.11; 340/545.3; 340/825.4; 340/7.51

(58) Field of Classification Search ........... 340/539.11, 340/539.1, 538.15, 539.21, 545.3, 825.4, 340/5.22, 5.23, 5.25, 5.6, 5.51–5.67, 7.2, 340/7.51
See application file for complete search history.

(56) References Cited

U.S. PATENT DOCUMENTS

| | | | | | |
|---|---|---|---|---|---|
| 5,150,913 | A | * | 9/1992 | Hoelzl ..................... 280/612 |
| 5,568,120 | A | * | 10/1996 | LeMense et al. ...... 340/426.28 |
| 5,929,771 | A | * | 7/1999 | Gaskill ..................... 340/7.54 |
| 6,006,086 | A | * | 12/1999 | Touzeau ................... 455/411 |
| 6,011,487 | A | * | 1/2000 | Plocher ................. 340/825.49 |
| 6,044,247 | A | * | 3/2000 | Taskett et al. ........... 340/7.28 |
| 6,703,919 | B2 | * | 3/2004 | Baset ....................... 340/5.72 |
| 6,799,035 | B1 | * | 9/2004 | Cousins .................... 455/418 |
| 2003/0098781 | A1 | * | 5/2003 | Baset ....................... 340/5.72 |

* cited by examiner

*Primary Examiner*—Daniel Wu
*Assistant Examiner*—Daniel Previl
(74) *Attorney, Agent, or Firm*—Marger Johnson & McCollom, P.C.

(57) ABSTRACT

A system allows binding in a one-way wireless transmission. The system includes a transmitting wireless device having a button and a receiving wireless device having a signaling mechanism. The second wireless device receives a code transmitted from the first wireless device when the button is pressed, determines if the code has been previously received, and accepts the code if not previously received. If the code is accepted, the second wireless device signals acceptance.

19 Claims, 3 Drawing Sheets

BINDING FOR ONE-WAY WIRELESS TRANSMISSIONS

This patent application claims priority from U.S. Provisional Application Ser. No. 60/483,004 filed Jun. 27, 2003.

BACKGROUND

1. Field of the Disclosure

The present disclosure relates generally to wireless communications, and in particular to wireless communications between hosts and peripherals.

2. Background

In wireless communications, devices need to 'bind' to each other in order to establish communication. Binding is a process in which one device will establish communication with another device using a certain channel code, and from that point on a link will be established between them. Channel access codes allow two devices to communicate. One device can communicate (one-way) with another device using its channel access code. The codes are selectable in case two or more devices have the same access code.

Because there may be many wireless devices broadcasting at any given time, a host device may receive many unintentional 'bind' requests intended for other hosts. Host devices may include personal computers. The host device has to determine which bind requests are intended for it, and which to ignore. The document "WirelessUSB™ LS 1-way HID Networks" by Cypress Semiconductor Corporation gives details of an exemplary embodiments of binding procedures. HID, as used here, means Human Interface Devices, such as mice, keyboards and other wireless peripherals.

A conventional binding procedure generally involves a user pressing a button on the host device and pressing another button on the peripheral device that is attempting to bind. The conventional binding procedure is suitable for some applications, but may be inconvenient for users who do not want to press buttons on two devices, such as when the user is not close to the host system. It would be desirable to have a binding procedure that does not require a user to press buttons on two devices.

SUMMARY

According to an embodiment, a binding procedure in one-way wireless transmissions is described A system allows binding in a one-way wireless transmission. The system includes a transmitting wireless device having a button and a receiving wireless device having a signaling mechanism. The second wireless device receives a code transmitted from the first wireless device when the button is pressed, determines if the code has been previously received, and accepts the code if not previously received. If the code is accepted, the second wireless device signals acceptance.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1A:
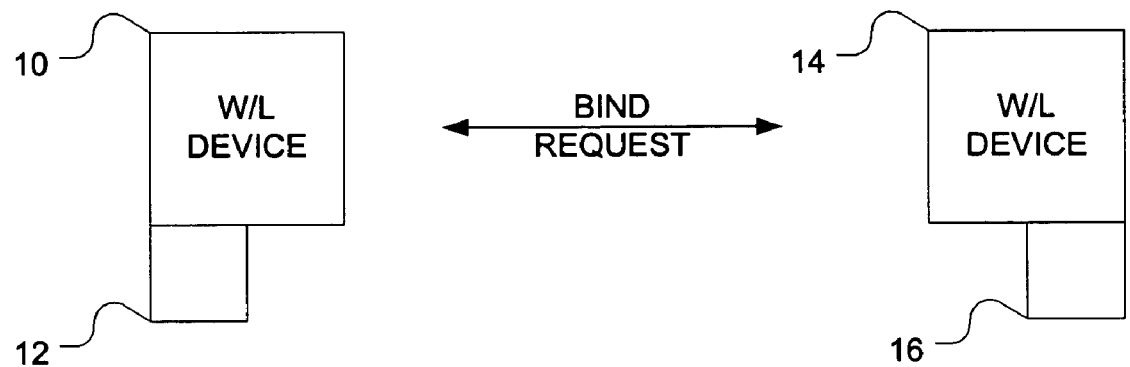
FIGS. 1a and 1b show a conventional binding procedure for wireless devices.

A conventional binding system and procedure for a wireless device, as shown in FIG. 1a, involves a user pressing a button 12 on the host device 10 and pressing another button 16 on the peripheral device 14 that is attempting to bind. In one exemplary embodiment the host device may be a wireless keyboard, and the peripheral device may be a wireless device.

Figure 1B:
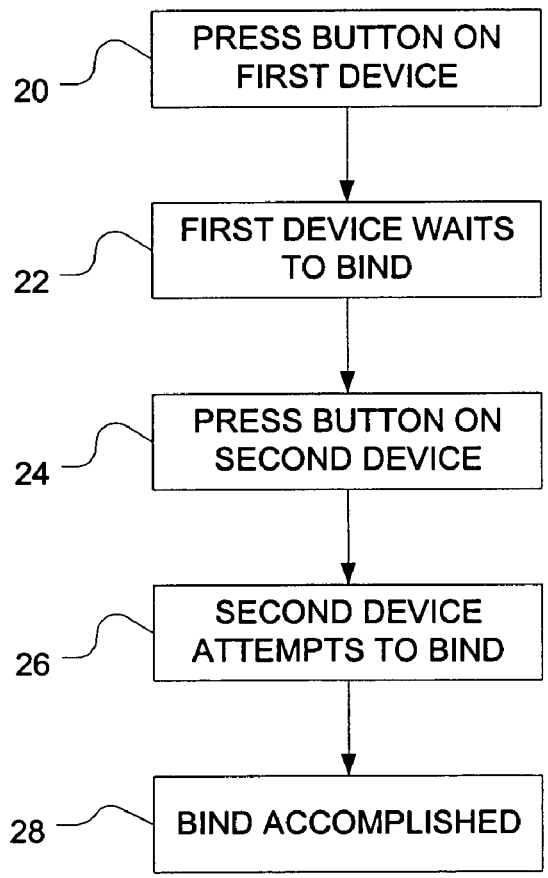

The process is shown in flowchart form in FIG. 1b. The user must first press a bind button on a first device, such as the host, at 20. This causes the host to enter 'wait for bind' state at 22. The user then presses a button on a second device, such as the peripheral 24. This causes the device to enter an 'attempt to bind' state at 26. When these two states overlap, bind is established at 28. The order in which the buttons are pressed may be reversed, with the peripheral device having its button pressed first followed by the host.

This may be awkward or inconvenient for the user. For example, the user may be using a wireless interface device that is located away from the host system, but still close enough to bind the two devices. The interval that one device is waiting for binding and the time it takes the user to push the button on the other device to attempt it to bind may not be long enough. The first device may be exit the waiting state before the other one is activated to attempt to bind.

Figure 2A:
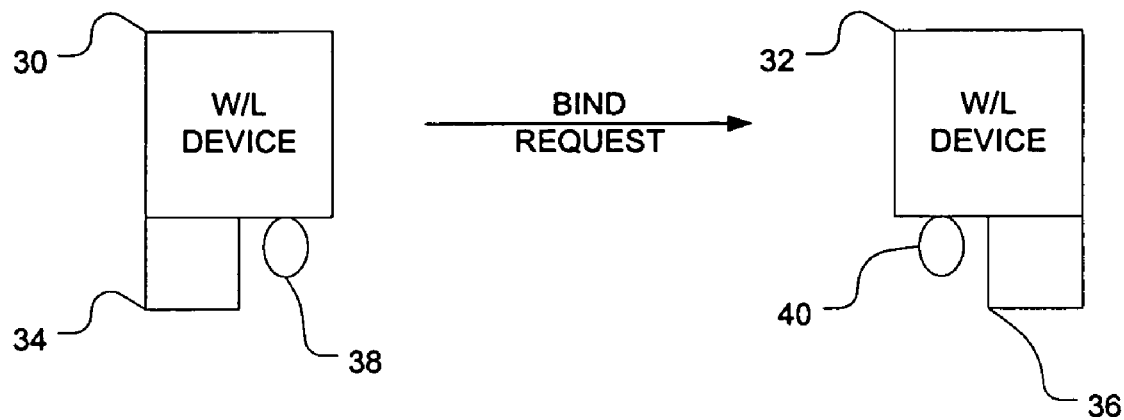
FIGS. 2a and 2b show an improved binding procedure for one-way wireless transmissions.
Figure 2B:
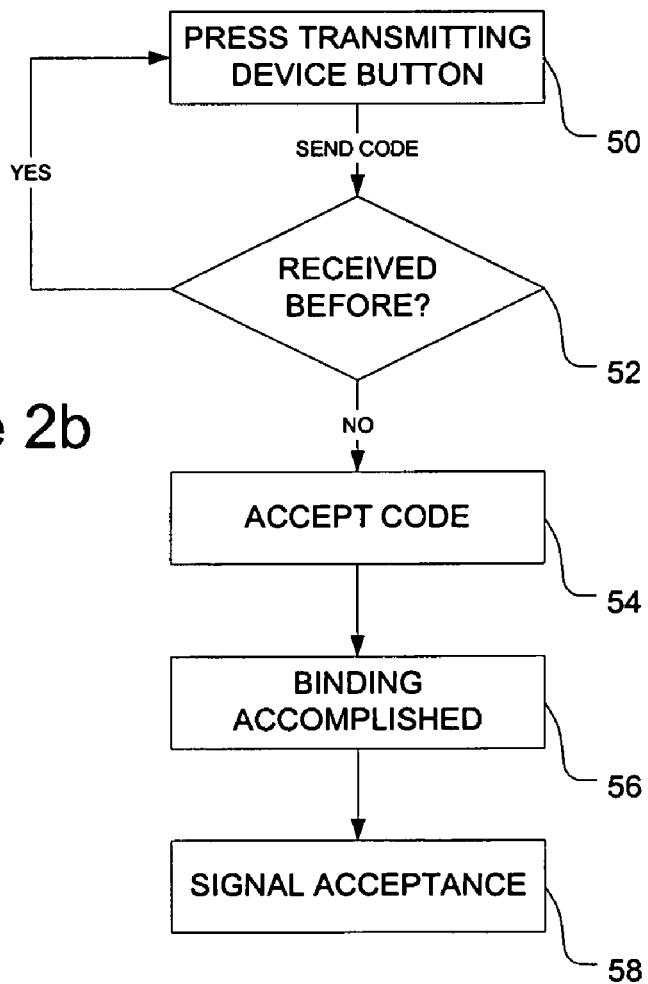

An embodiment of an improved binding system and procedure in one-way wireless transmissions is described in FIGS. 2a and 2b. According to the improved binding system, shown in FIG. 2a, each device 30 and 32 may have connect buttons 34 and 36, respectively, for binding the devices. Again, binding is the process of selecting an access code for a device that another device will use to communicate therewith. In embodiments of the improved binding system, each device also has an LED 38 and 40, respectively. One or the other device may not have a connect button, as it is not necessary in both devices to implement the binding, but would allow either device to be the binding requesting device.

An embodiment of a binding procedure using the improved system of FIG. 2a is shown in FIG. 2b. The first device button is pressed at 50 and it sends an access code to the receiver device. The receiver determines if it has received that access code before this transmission at 52. This may be accomplished by sorting a memory to determine if the code has been previously been stored. The memory may comprise a look up table, where the table is indexed using some portion of the received code. If the receiver has not received the access code before, it accepts the code at 54. This accomplishes binding at 56. The device then lights its LED, or otherwise signals acceptance, at 58 to inform the user of binding. The devices are then bound.

The lighting of the LED provides the user with a status of the acceptance of the code. If the LED lights, the user knows that the status of the code is 'accepted.' A lack of light indicates that the status of the code is 'not accepted.'

However, if the receiver device has previously received the code at 52, then the LED does not light. In response to the failure to light, the process returns to 50. The user presses the button again, and the transmitter then selects another code. This process repeats until the code is accepted and the LED on the receiver lights.

In another embodiment, the light or LED could be replaced with some other signaling mechanism such as a speaker to generate an audible signal, or another way of signaling to the user that bind has been achieved.

In another embodiment, the wireless host may not have a button, just a signaling mechanism. The user would then bind the peripheral to the host by pressing a button on the peripheral only and the host would signal binding. Signaling binding may include displaying a message, if the host has a display of some sort such as a monitor or computer terminal.

In another embodiment, the transmitting device may not have a signaling mechanism. The receiving device is the device that indicates acceptance of the currently transmitted code. The transmitting device may therefore not need a signaling mechanism, where the signaling mechanism is directed to signaling binding.

In another embodiment, one or the other device may have a non-binding signal in addition to the binding signal. Only having a binding signal may leave the user guessing that the two devices did not bind. The user may decide that the two devices did not bind, when in actuality the process had not finished yet. The user may press the button again, resulting in transmission of a second, unnecessary code. A second signal may indicate no binding.

An example would be to have two differently colored LEDs, one indicating binding and one indicating no binding. This eliminates any guesswork on the part of the user and confirms that binding either succeeded or failed. When binding fails, the user then pushes the button as required. Other non-binding signals may include an audible signal that indicates no binding, or displaying an indicator of no binding on a display.

In addition to allowing binding by only pressing a button on one of the device involved in the binding transaction, the use of a one-way binding procedure eliminates the need to pre-program the devices with codes. This may eliminate the requirement for non-volatile memory on the devices, previously used to store the codes.

Figure 3:
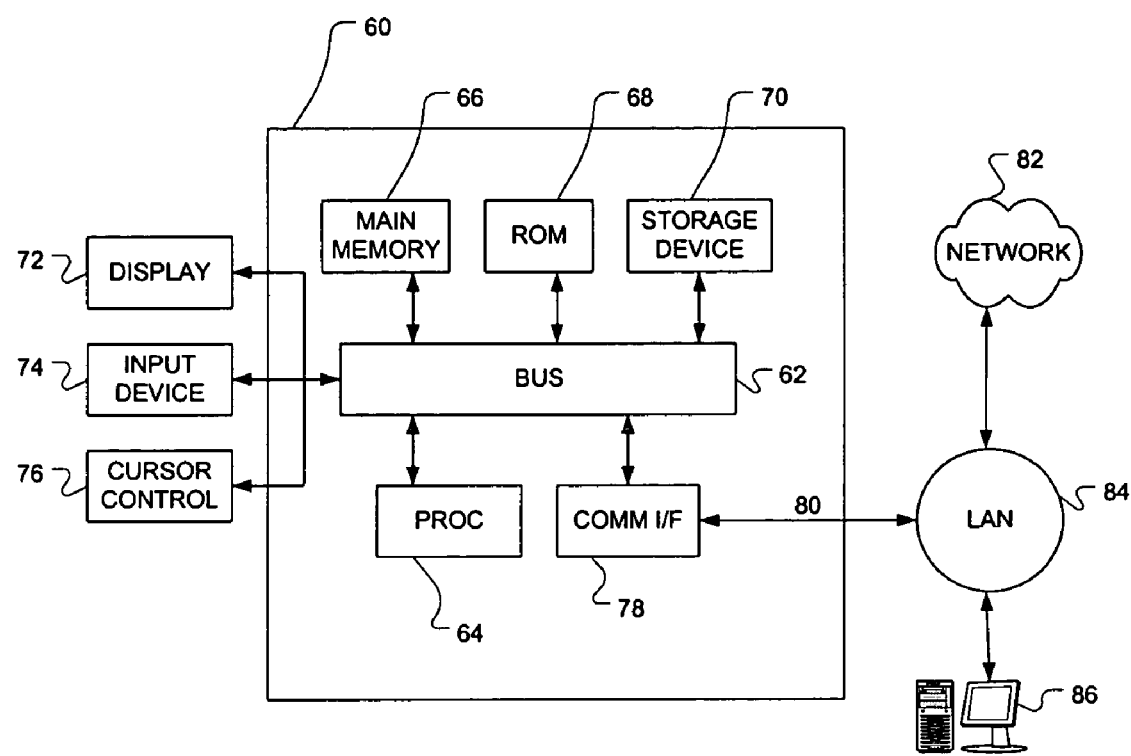
FIG. 3 shows an exemplary system with which the improved binding procedure may be used.

A system shown in FIG. 3 may comprise a computer system 60 in which an embodiment according to the present invention can be implemented. The computer system 60 includes a bus 62 or other communication mechanism for communicating information and a processor 64 coupled to the bus 62 for processing information. The computer system 60 also includes main memory 66, such as a random access memory (RAM) or other dynamic storage device, coupled to the bus 62 for storing information and instructions to be executed by the processor.

Main memory 66 can also be used for storing temporary variables or other intermediate information during execution of instructions by the processor 64. The computer system 60 may further include a read only memory (ROM) 68 or other static storage device coupled to the bus 62 for storing static information and instructions for the processor 64. A storage device 70, such as a magnetic disk or optical disk, is coupled to the bus 62 for persistently storing information and instructions.

The computer system 60 may be coupled via the bus 62 to a display, such as a cathode ray tube (CRT), liquid crystal display, active matrix display, or plasma display, for displaying information to a computer user. An input device 74, such as a keyboard including alphanumeric and other keys, is coupled to the bus 62 for communicating information and command selections to the processor 64. Another type of user input device is a cursor control 76, such as a mouse, a trackball, or cursor direction keys, for communicating direction information and command selections to the processor 64 and for controlling cursor movement on the display 72.

According to one embodiment of the invention, the improved procedure may be used with or implemented as part of the computer system 60, and the overall system may operate in response to the processor 64 executing an arrangement of instructions contained in main memory 66. Such instructions can be read into main memory 66 from another computer-readable medium, such as the storage device 70. Execution of the arrangement of instructions contained in main memory 66 causes the processor 64 to perform the process steps described herein. One or more processors in a multi-processing arrangement may also be employed to execute the instructions contained in main memory 66.

In alternative embodiments, hard-wired circuitry may be used in place of or in combination with software instructions to implement the embodiment of the present invention. As discussed above, current wireless peripherals have a button to allow binding. The current peripherals are generally accompanied by software, such as driver files that allow the host system to communicate with them during the binding process as well as in operation after binding. These driver files could be modified to allow the binding signal from the peripheral to cause a signal from the host to indicate binding or not binding.

For example, the host device may be a computer with a display. The peripheral may be an already-existing mouse. With a modified driver file, the mouse can be installed. When binding is performed, the display may indicate binding or no binding. There is no need to modify the existing hardware of the mouse, only the driver.

In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 60 also includes a communication interface 78 coupled to bus 62. The communication interface 78 provides a two-way data communication coupling to a network link 80 connected to a local network 84. For example, the communication interface 78 may be a digital subscriber line (DSL) card or modem, an integrated services digital network (ISDN) card, a cable modem, a telephone modem, or any other communication interface to provide a data communication connection to a corresponding type of communication line.

As another example, communication interface 78 may be a local area network (LAN) card, such as for an Ethernet™ network in accordance with Institute of Electrical and Electronic Engineers (IEEE) standard 802.3, or an Asynchronous Transfer Model (ATM) network) to provide a data communication connection to a compatible LAN. Wireless links can also be implemented.

In any such implementation, communication interface 78 sends and receives electrical, electromagnetic, or optical signals that carry digital data streams representing various types of information. Further, the communication interface 78 can include peripheral interface devices, such as a Universal Serial Bus (USB) interface, a PCMCIA (Personal Computer Memory Card International Association) interface, etc. Although a single communication interface 78 is depicted in FIG. 3, multiple communication interfaces can also be employed.

The network link 80 typically provides data communication through one or more networks to other data devices. For example, the network link 80 may provide a connection through local network 84 to a host computer 86, which has connectivity to a network 82, such as a wide area network (WAN) or the global packet data communication network now commonly referred to as the "Internet" or to data equipment operated by a service provider. The local network 84 and the network 82 both use electrical, electromagnetic, or optical signals to convey information and instructions. The signals through the various networks and the signals on the network link 80 and through the communication interface 78, which communicate digital data with the computer system 60 are exemplary forms of carrier waves bearing the information and instructions.

The computer system 60 can send messages and receive data, including program code, through the network(s), the network link 80, and the communication interface 78. In the Internet example, a server (not shown) might transmit requested code belonging to an application program for implementing an embodiment of the present invention through the network 82, the local network 84 and the communication interface 78. The processor 64 may execute the transmitted code while being received and/or store the code in the storage device 70, or other non-volatile storage for later execution. In this manner, the computer system 60 may obtain application code in the form of a carrier wave.

As mentioned previously, one issue that may arise in binding wireless devices is that there may be several devices that rely upon the binding procedure to establish communications. Referring to system 60, for example, the input device 74 as well as the cursor control device 76 may require binding to establish the communications channel between these devices and the system 60.

For example, assume the input device 74 is bound first, using a first channel code. When the cursor control device 76 first attempts to bind, it transmits the same channel code already in use. This will require another iteration of the binding process. If the user has to press buttons on both devices, as is required in implementations prior to this invention, this process can become inconvenient. Using embodiments of this invention make this process much more convenient for the user.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects.

This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Thus, although there has been described to this point a particular embodiment for a method and apparatus for one-way wireless binding between devices, it is not intended that such specific references be considered as limitations upon the scope of this invention except in-so-far as set forth in the following claims.

What is claimed is:

1. A system, comprising:
   a transmitting wireless device having a button to allow transmission of a channel access code to allow communication with the transmitting device;
   a receiving wireless device having a signaling mechanism, the receiving wireless device to:
      receive the channel access code transmitted from the transmitting wireless device when only the button on the transmitting wireless device is pressed;
      determine if the channel access code has been previously received;
      accepting the channel access code if not previously received;
      signal as to a status of acceptance of the channel access code; and
      use the channel access code to communicate with the transmitting device.

2. The system of claim 1, the receiving wireless device further comprising a button.

3. The system of claim 1, the transmitting wireless device further comprising a signaling mechanism.

4. The system of claim 1, the signaling mechanism further comprising one of the group comprised of: a single LED, a pair of differently colored LEDs, an audible signaling mechanism, and a display.

5. The system of claim 1, the transmitting wireless device further comprising a wireless peripheral.

6. The system of claim 1, the receiving wireless device further comprising a wireless host.

7. A device, comprising:
   a receiver;
   a signaling mechanism; and
   a processor to:
      receive a channel access code upon a pressing of a button only on a wireless device, wherein the channel access code allows communication between the wireless device and the device;
      determine if the channel access code has been previously received;
      accept the channel access code if the access code had not been previously received;
      activate the signaling mechanism to indicate acceptance; and
      use the channel access code to communicate with the wireless device.

8. The device of claim 7, the signaling mechanism further comprising one of the group comprised of: a single LED, a pair of differently colored LEDs, an audible signaling mechanism, and a display.

9. The device of claim 7, the device further comprising a personal computer.

10. The device of claim 7, the processor further to activate a second signaling mechanism to indicate rejection of the channel access code.

11. The device of claim 7, the device further comprising a memory having a look up table to store previously received channel access codes.

12. The device of claim 7, the device further comprising a button to allow it to initiate a binding process.

13. A method of binding a wireless device, the method comprising:
    receiving a channel access code from a wireless device only when a button on the wireless device has been pressed;
    determining if the channel access code has been previously received;
    if the channel access code has not been previously received, accepting the channel access code;
    indicating acceptance of the channel access code; and
    using the channel access code to communicate with the wireless device.

14. The method of claim 13, determining if the channel access code has been previously received further comprising accessing a memory to determine if the channel access code has been previously stored.

15. The method of claim 13, indicating acceptance of the channel access code further comprising activating a signaling mechanism.

16. The method of claim 15, activating a signaling mechanism further comprising one of the group comprised of: lighting an LED, producing an audible signal, and displaying a binding indicator on a display.

17. The method of claim 13, the method further comprising rejecting the channel access code.

18. The method of claim 17, rejecting the channel access code further comprising activating a signaling mechanism to indicate rejection.

19. The method of claim 18, activating a signaling mechanism to indicate rejection further comprising one of the group comprised of: lighting an LED, producing an audible signal and displaying a binding indicator on a display.

* * * * *